United States Patent
Park et al.

(10) Patent No.: US 12,455,720 B1
(45) Date of Patent: Oct. 28, 2025

(54) MUSIC MODULATION AUDITORY FEEDBACK SYSTEM USING WIRELESS EARPHONE AND SMART PHONE

(71) Applicant: JEONJU UNIVERSITY OFFICE OF INDUSTRY-UNIVERSITY COOPERATION, Jeonju-si (KR)

(72) Inventors: Kyuenam Park, Jeonju-si (KR); Sihyun Kim, Wonju-si (KR)

(73) Assignee: JEONJU UNIVERSITY OFFICE OF INDUSTRY-UNIVERSITY COOPERATION, Jeonju-si (KR)

( * ) Notice: Subject to any disclaimer, the term of this patent is extended or adjusted under 35 U.S.C. 154(b) by 523 days.

(21) Appl. No.: 17/999,808

(22) PCT Filed: Jan. 8, 2021

(86) PCT No.: PCT/KR2021/000243
§ 371 (c)(1),
(2) Date: Mar. 22, 2023

(87) PCT Pub. No.: WO2022/030708
PCT Pub. Date: Feb. 10, 2022

(30) Foreign Application Priority Data

Aug. 5, 2020 (KR) .......................... 10-2020-0097870

(51) Int. Cl.
*G06F 3/16* (2006.01)
*H04R 1/10* (2006.01)

(52) U.S. Cl.
CPC .............. *G06F 3/167* (2013.01); *G06F 3/162* (2013.01); *G06F 3/165* (2013.01); *H04R 1/1041* (2013.01); *H04R 2420/07* (2013.01)

(58) Field of Classification Search
CPC .......... G06F 3/167; G06F 3/162; G06F 3/165; H04R 1/1041; H04R 2420/07
See application file for complete search history.

(56) References Cited

U.S. PATENT DOCUMENTS

| | | | |
|---|---|---|---|
| 11,334,978 B2 * | 5/2022 | Bhat | G06T 7/0002 |
| 11,726,550 B2 * | 8/2023 | Sankhla | G06F 3/016 |
| | | | 345/156 |

(Continued)

FOREIGN PATENT DOCUMENTS

| | | | | |
|---|---|---|---|---|
| CN | 109618263 | * | 4/2019 | ........... H04R 1/1041 |
| KR | 10-0556437 B1 | | 3/2006 | |

(Continued)

OTHER PUBLICATIONS

International Search Report issued in PCT/KR2021/000243; mailed Apr. 30, 2021.

*Primary Examiner* — Haoshian Shih
(74) *Attorney, Agent, or Firm* — Studebaker Brackett PLLC

(57) ABSTRACT

An auditory feedback system according to the present invention is provided. The auditory feedback system comprises: an acceleration sensor configured to measure the body inclination of a user who walks or exercises while wearing a wireless earphone; and a control unit configured to determine whether the body inclination is greater than or equal to a predetermined angle with respect to a body center line, wherein the control unit can control the wireless earphone to provide a first type of music as first auditory feedback if the body inclination is determined to be in a neutral state of being less than the predetermined angle, and provide a second type of music as second auditory feedback if the body inclination is determined to be in an inclined state of being greater than or equal to the predetermined angle.

10 Claims, 6 Drawing Sheets

(56) References Cited

U.S. PATENT DOCUMENTS

2020/0111384 A1* 4/2020 Bell .................. A61B 5/11
2020/0196045 A1* 6/2020 Tamir ................ G08B 5/22

FOREIGN PATENT DOCUMENTS

| KR | 10-1831968 B1 | 4/2018 |
| KR | 10-2019-0015851 A | 2/2019 |
| KR | 10-2051004 B1 | 12/2019 |
| KR | 10-2120828 B1 | 6/2020 |

* cited by examiner

MUSIC MODULATION AUDITORY FEEDBACK SYSTEM USING WIRELESS EARPHONE AND SMART PHONE

CROSS-REFERENCE TO RELATED APPLICATIONS

This application is the U.S. National Stage of International Application No. PCT/KR2021/000243 filed Jan. 8, 2021, which claims benefit of priority to Korean Patent Application No. 10-2020-0097870 filed Aug. 5, 2020, the entire content of which is incorporated herein by reference.

TECHNICAL FIELD

The present invention relates to an auditory feedback system. More particularly, the present invention relates to an auditory feedback system for music modulation using a wireless earphone and a smartphone.

RELATED ART

Through biofeedback, information on a physiological activity state of a user may be provided to the user in real time. This relates to a technique that allows the user to change the user's own physiological activity in a desired direction using such feedback information and to learn self-regulation by providing a reward when a required level of change occurs.

Meanwhile, this biofeedback may be provided during walking or exercise process. In this regard, the biofeedback may be visually provided through a mobile terminal or a wearable device. However, for the user to perceive the feedback that is provided in a visual manner in real time, the user needs to continuously pay attention to information that is being displayed even during exercise.

Also, it is necessary to detect a posture of the user to provide feedback on a gait posture or an exercise posture during walking or exercise. In this regard, the user needs to wear a separate wearable device for detecting the posture of the user that is walking or exercising. For example, the user needs to separately wear a sleeve sensor or a head sensor to detect whether the user is walking or exercising in an appropriate posture.

DETAILED DESCRIPTION

Technical Subject

Therefore, to solve the aforementioned issues, an objective of the present invention is to provide an auditory feedback system during exercise.

Also, an objective of the present invention is to provide feedback on an exercise state without a need to gaze at information that is being displayed during exercise.

Also, an objective of the present invention is to provide an auditory feedback system for music modulation without a separate sensor device or wearable device during exercise.

Technical Solution

To solve the aforementioned objectives, there is provided an auditory feedback system according to an aspect of the present invention. The auditory feedback system may include an acceleration sensor configured to measure a body inclination of a user walking or exercising with a wireless earphone worn; and a controller configured to determine whether the body inclination is greater than or equal to a predetermined angle with respect to a body center line. The controller may control the wireless earphone to provide a first type of music as first auditory feedback when the body inclination is determined to be in a neutral state of being less than the predetermined angle, and to provide a second type of music as second auditory feedback when the body inclination is in an inclined state of being greater than or equal to the predetermined angle.

According to an example embodiment, the controller may provide the second auditory feedback as a first attribute when a head of the body is determined to be in the inclined state of being greater than or equal to a first angle in a direction of a horizontal axis, and may provide the second auditory feedback as a second attribute when the head is determined to be in the inclined state of being greater than or equal to a second angle in a direction of a vertical axis. The second attribute may be determined such that the second auditory feedback is provided at a shorter interval as sound with a higher pitch than the first auditory feedback.

According to an example embodiment, the controller may transmit information on the body inclination, information on a degree at which the head of the body is inclined in the direction of the horizontal axis and the vertical axis, and attribute information of the auditory feedback to a mobile terminal of the user walking or exercising.

According to an example embodiment, the mobile terminal may generate a first analysis result by analyzing a side-effect on a specific body part according to an exercise state of the user and the walking or exercise based on information on the body inclination, information on the degree at which the head of the body is inclined in the direction of the horizontal axis and the vertical axis, and a movement speed, a movement distance, and a movement path of the user.

According to an example embodiment, the auditory feedback system may further include a server configured to receive, from the mobile terminal, and store information on the body inclination, information on the degree at which the head of the body is inclined in the direction of the horizontal axis and the vertical axis, and the movement speed, the movement distance, and the movement path of the user. The server may generate a second analysis result based on prestored information on the body inclination, information on the degree at which the head of the body is inclined in the direction of the horizontal axis and the vertical axis, information on the movement speed, the movement distance, and the movement path of the user, the received information, and information on a body inclination and movement state information on a plurality of users, and may finally generate an analysis result about the side-effect according to the exercise state of the user and the walking or exercising based on the first analysis result and the second analysis result.

According to an example embodiment, the auditory feedback system may further include a camera configured to capture a user during exercise; and a second controller configured to compare and analyze a motion of the user captured by the camera and a motion of an expert of an exercise program in which the user is exercising. The second controller may analyze a similarity between the motion of the user and the motion of the expert for a specific body part selected based on a type of the exercise program and an exercise motion, and controls a speaker to provide auditory feedback when the motion of the user is determined to be dissimilar to the motion of the expert and movement information of a wireless earphone worn by the expert may be learned and transmitted to the mobile terminal, and the second controller may compare the learned movement information and the motion of the user and may provide the auditory feedback.

According to an example embodiment, the second controller may analyze the similarity between the motion of the user and the motion of the expert for each body part of the user based on the type of the exercise program and the exercise motion and may control a speaker to provide different auditory feedback for each body part when the motion of the user is determined to be dissimilar to the motion of the expert.

According to an example embodiment, the second controller may store a corresponding frame in which the motion of the user is determined to be dissimilar to the motion of the expert in the captured video. The second controller may display the motion of the user that is dissimilar to the motion of the expert for each body part of the user in the corresponding frame, and may include and store feedback attribute information in the corresponding frame such that different auditory feedback is playable for each body part.

There is provided an auditory feedback system according to another aspect of the present invention. The auditory feedback system may include a camera configured to a capture a user during exercise; and a processor configured to compare and analyze a motion of the user captured by the camera and a motion of an expert of an exercise program in which the user is exercising. The processor may analyze a similarity between the motion of the user and the motion of the expert for a specific body part selected based on a type of the exercise program and an exercise motion and may control a speaker to provide auditory feedback when the motion of the user is determined to be dissimilar to the motion of the expert.

According to an example embodiment, movement information of a wireless earphone worn by the expert may be learned and transmitted to the mobile terminal, and the processor may compare the learned movement information and the motion of the user and may provide the auditory feedback.

According to an example embodiment, the processor may store a corresponding frame in which the motion of the user is determined to be dissimilar to the motion of the expert in the captured video. The processor may display the motion of the user that is dissimilar to the motion of the expert for each body part of the user in the corresponding frame, and may include and store feedback attribute information in the corresponding frame such that different auditory feedback is playable for each body part. When the motion of the user dissimilar to the motion of the expert is displayed in response to playback of a file that stores the corresponding frame, the processor may control the different auditory feedback to be displayed based on the feedback attribute information.

Effect

According to the present invention, it is possible to provide an auditory feedback system for music modulation using a wireless earphone and/or a smartphone during exercise.

According to the present invention, it is possible to provide feedback on an exercise state through an auditory feedback system without a need to gaze at information that is separately being displayed during exercise through a wireless earphone or a speaker of a mobile terminal.

According to the present invention, it is possible to provide an auditory feedback system for music modulation without a separate sensor device or wearable device during exercise through a wireless earphone or a speaker of a mobile terminal.

The aforementioned features and effects of the present invention may become more clear through the following detailed description associated with the accompanying drawings and accordingly, one skilled in the art to which the present invention pertains may easily implement the technical spirit of the present invention.

BEST MODE

Figure 1A:
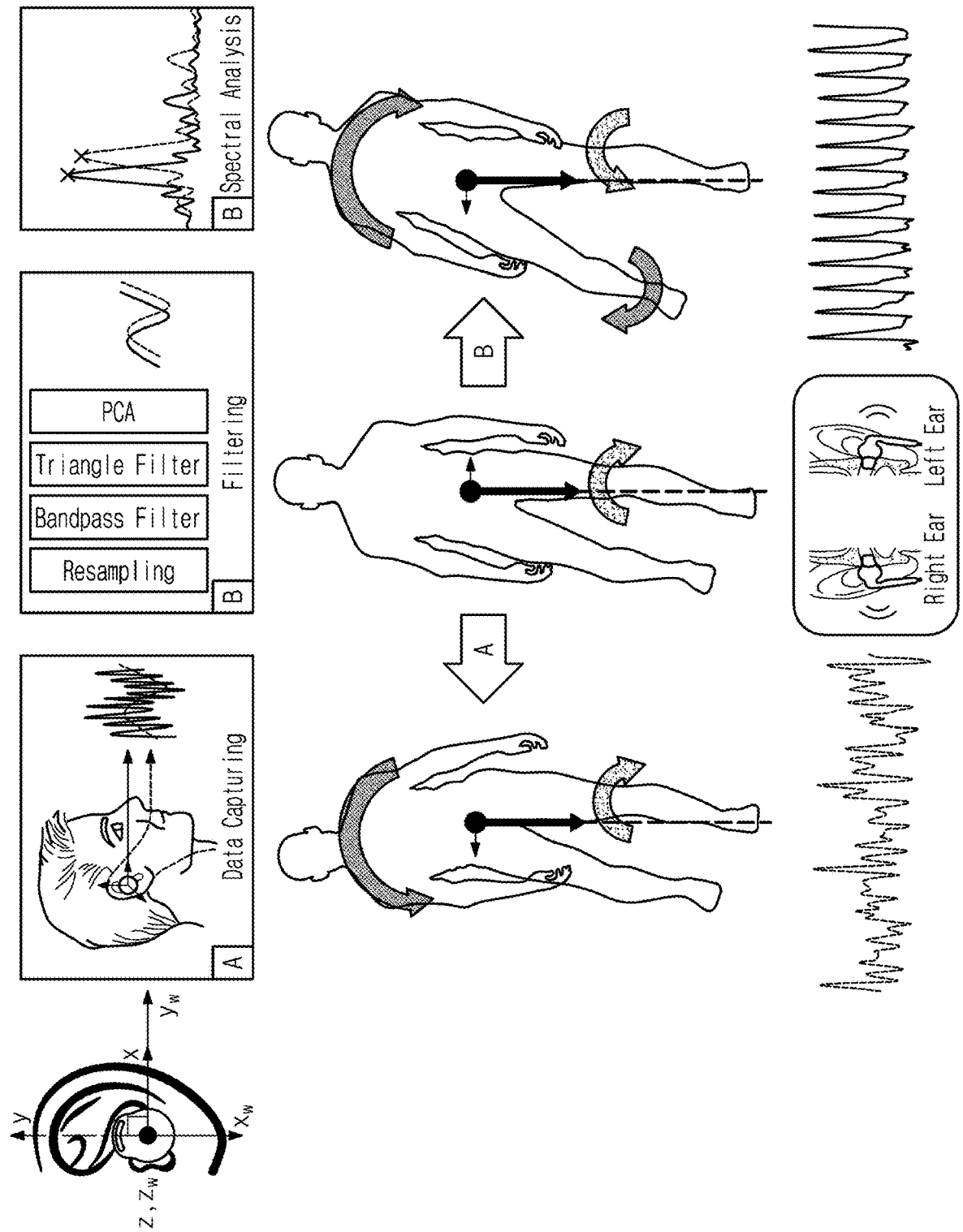
FIGS. 1A and 1B illustrate an auditory feedback system for music modulation using a wireless earphone according to an example embodiment.

The aforementioned features and effects of the present invention may become more clear through the following detailed description associated with the accompanying drawings and accordingly, one skilled in the art to which the present invention pertains may easily implement the technical spirit of the present invention.

Various modifications may be made to the present invention and some example embodiments may be provided and thus, specific example embodiments are illustrated in drawings and described in detail in the detailed description. However, the present invention is not construed as limited to specific implementation and should be understood to include all changes, equivalents, and replacements within the idea and the technical scope of the present invention.

Describing the respective drawings, like reference numerals like elements throughout.

Although terms of "first," "second," and the like are used to explain various components, the components are not limited to such terms. These terms are used only to distinguish one component from another component.

For example, a first component may be referred to as a second component, or similarly, the second component may be referred to as the first component within the scope of the present invention. Also, the term "and/or" includes a combination of listed items related to a plural form or one of the listed items.

Unless otherwise defined, all terms used herein including technical or scientific terms have the same meanings as those generally understood by one of ordinary skill in the art.

Terms defined in dictionaries generally used should be construed to have meanings matching contextual meanings in the related art and are not to be construed as an ideal or excessively formal meaning unless otherwise defined herein.

The suffixes "~ module," "~ block," and "~ unit" for components used herein are assigned or used interchangeably in consideration of ease of writing the specification and do not have a meaning or a role that is distinguished from each other by itself.

Hereinafter, example embodiments of the present invention will be described to be easily implemented by one skilled in the art with reference to the accompanying drawings. In describing the following example embodiments, when it is determined that description related to a known function or configuration makes the subject matter of the present invention unnecessarily ambiguous, the detailed description is omitted.

Hereinafter, an auditory feedback system for music modulation using a wireless earphone and a smartphone according to the present invention is described with reference to the accompanying drawings.

Figure 1B:
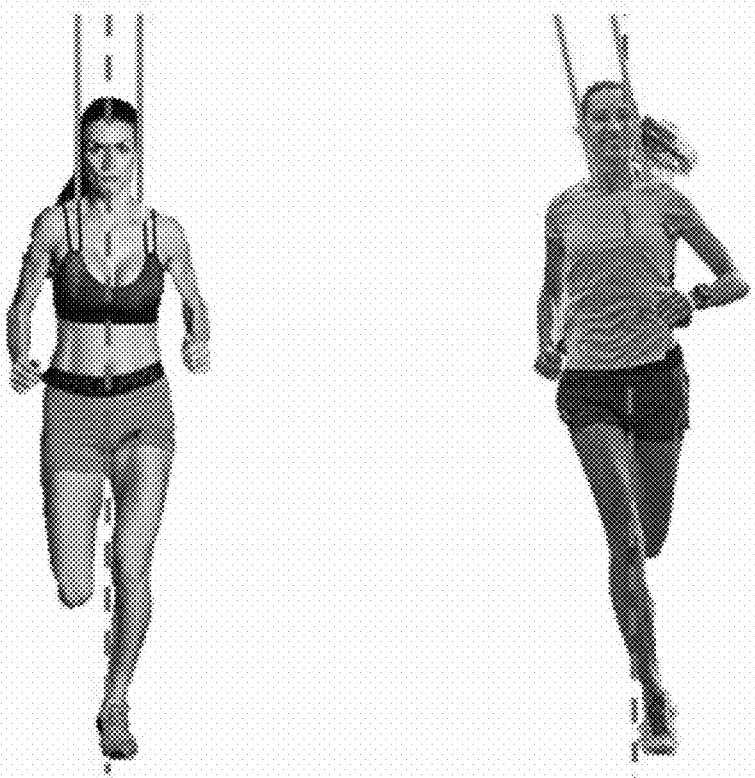

FIGS. 1A and 1B illustrate an auditory feedback system for music modulation using a wireless earphone according to an example embodiment. In detail, FIG. 1A illustrates an auditory feedback system for a body inclination during a walking motion using an acceleration sensor of a wireless earphone. Meanwhile, FIG. 1B illustrates an auditory feedback system for a body inclination during a running motion using a wireless earphone.

Referring to FIG. 1A, data capturing on the body inclination may be performed using the acceleration sensor of the wireless earphone during the walking motion. Resampling, bandpass filtering, triangle filtering, and principal component analysis (PCA) may be performed on data acquired through data capturing. Also, as described above, spectral analysis may be performed on filtered data.

In this manner, a direction (left direction (A) or right direction (B)) in which the body is inclined may be detected through filtering/analysis related to data on the body inclination using the acceleration sensor of the wireless earphone during the walking motion. In this regard, a direction in which a head part is inclined in relation to the torso and a direction in which a lower body part (e.g., a knee part) is inclined in relation to the torso may be detected and a direction in which the torso (e.g., core movement) is inclined in relation to the head may be detected.

Also, a degree of inclination of the body may be detected by filtering/analyzing data related to the body inclination. In this regard, an angle at which the head part is inclined in relation to the torso and an angle at which the lower body part (e.g., knee part) is inclined in relation to the torso may be detected. Also, the direction in which the torso (e.g., core movement) is inclined in relation to the head may be detected.

Referring to FIG. 1B, data capturing on the body inclination may be performed using the acceleration sensor of the wireless earphone during the running motion. In this regard, a filtering and analysis process may be performed on data acquired through data capturing in a similar manner to FIG. 1A. Here, a data capturing period and a sampling interval may be reduced in consideration of the running motion. Also, a band to be filtered in consideration of the running motion may be moved to a higher band than that of the walking motion or may be filtered over a wide band.

As described above, a direction (left direction or right direction) in which the body is inclined may be detected by filtering/analyzing data related to the body inclination using the acceleration sensor of the wireless earphone during the running motion. In this regard, a direction in which a head part is inclined in relation to the torso and a direction in which a lower body part (e.g., a knee part) is inclined in relation to the torso may be detected and a direction in which the torso (e.g., core movement) is inclined in relation to the head may be detected.

Referring to FIG. 1B, if a neutral state is determined as a detection result through the acceleration sensor of the wireless earphone, it may be assumed that the head is present at a neutral position with respect to a body centerline. When the head is present at the neutral position with respect to the body centerline, it may be determined that a core function is in a good running state. Therefore, positive auditory feedback, for example, exciting music, may be provided.

On the contrary, if an inclined state is determined as a detection result through the acceleration sensor of the wireless earphone, it may be assumed that the head is present at an inclined position with respect to the body centerline. When the head is present at the inclined state with respect to the body centerline, it may be determined that the core function is in a poor running state. Therefore, negative auditory feedback, for example, modulated music, may be provided.

Figure 2:
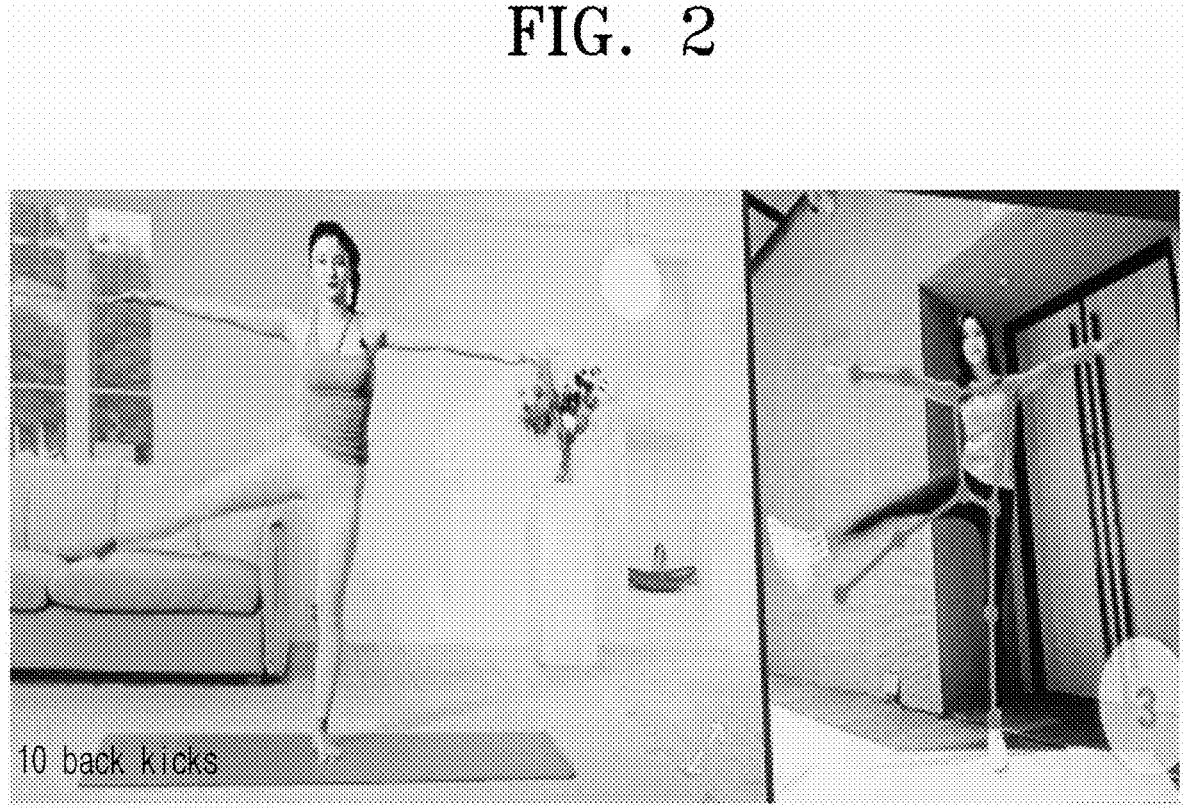
FIG. 2 illustrates an auditory feedback system for music modulation using a smartphone according to another example embodiment.

Meanwhile, FIG. 2 illustrates an auditory feedback system for music modulation using a smartphone according to another example. Referring to FIG. 2, music-auditory feedback may be provided during Pilates exercise using a smartphone camera. In this regard, in addition to the Pilates exercise, music-auditory feedback according to various exercises that follow an exercise motion through a screen may be provided.

Referring to FIG. 2, when a smartphone camera recognizes a body part (which is indicated on the right) different from an expert (left) motion, modulated music (negative feedback) may be played back. In this regard, it may be differently displayed for each body part different from the expert (left) motion. For example, a leg part on one side may be displayed in a first color (e.g., red) and a leg part, an arm part, and a torso part on the other side may be displayed in a second color (e.g., green).

In this regard, a main exercise part of the exercise motion displayed on a specific screen on which the Pilates exercise is being played back may be a leg part on one side. Therefore, the leg part on one side that is a main exercise part of an exercise motion displayed on the specific screen may be displayed in a color different from that used for another body part and when a motion of the leg part on one side is displayed to be different from the expert motion, modulated music (negative feedback) may be output.

In this regard, according to the present invention, a movement of a wireless earphone of the exercise expert may be learned and shared with the user and compared with a movement of the user to provide auditory feedback. Also, in association with an angle of inclination, the movement of the exercise expert may be compared with that of the user and feedback may be provided according to a reference angle value set by the user.

The auditory feedback system using a wireless earphone and a smartphone according to the present invention may apply to information communication and cultural content application field. Also, the auditory feedback system using the wireless earphone and the smartphone according to the present invention may use technical features, such as human kinematics, motion analysis, sensor engineering, and acoustic engineering.

Meanwhile, the auditory feedback system using the wireless earphone and the smartphone according to the present invention are conceived to derive the following solutions to solve the following conventional issues. 1) As a conventional method, since there is no trainer or therapist around a user and the user simply views and follows an exercise, the user is not sure whether the user is following the exercise well and feels that the effect of the exercise is small. To solve this issue, the present invention provides a feedback system for convincing the user that the user is following the exercise well.

2) The conventional method has an issue in that the user may feel unfamiliar with exercise without tools since exercise equipment provided in outdoor exercise facility is absent at home. To solve this issue, the present invention provides various verified exercise methods that may be performed without tools. 3) The conventional home training method simply provides feedback on indoor exercise that includes exercise performed on the floor and does not provide feedback on exercise methods preferred by people, such as outdoor walking, running, cycling, walking and running on a treadmill, and indoor cycling. To solve this issue, the present invention may provide music-auditory feedback such that the user may exercise properly through a movement of a head and torso (core) even outdoors and be motivated. 4) The conventional method has an issue in that it is difficult for the user to maintain motivation to start exercising and the will to exercise. To solve this issue, the present invention may provide music-auditory feedback based on the fact that the user may easily start exercising while listening to music.

5) The conventional method has an issue in that it is difficult for fitness experts to be aware of whether customers are following well when the fitness experts are providing online personal training. To solve this issue, the present invention provides a system that may remotely be aware of an exercise posture of a customer.

Meanwhile, a feedback system according to the present invention may need to supplement/develop current home training technology as follows: 1) Current home training technology may be an online home training video using YouTube and Naver. The online home training video allows the user to follow a method that may be performed at home without tools while viewing a video of a famous trainer and celebrity and has relatively good accessibility. However, the online home training video may evaluate whether the user is following a corresponding exercise program well. The development of feedback technology is required.

2) The current home training technology may relate to smart home training. In this regard, the present invention may display a part of which the user is exercising differently from the expert in red through artificial intelligence. Meanwhile, it may be difficult to quickly correct an exercise posture through such visual feedback. Therefore, the development of auditory feedback technology showing a motion reaction faster than visual feedback may be required. Also, in the case of measuring the exercise effect and the exercise posture using an artificial intelligence method, a separate wearable sensor may be required for measurement accuracy.

3) Meanwhile, the user may follow a home training video while listening to speech of a trainer without a video. However, it is difficult to follow an unfamiliar exercise motion only with explanation without the video and a home training program provided only by speech makes the user feel that the corresponding program is boring. Therefore, the present invention provides a similarity evaluation of an artificial intelligence method for motions that the user follows while exercise motions of the expert are being provided as the video and an auditory feedback system for the same as music such that the user may exercise with pleasant and correct motions without being bored.

Meanwhile, a final technical objective of the auditory feedback system using the wireless earphone and the smartphone according to the present invention is to develop a music-auditory feedback system using a wireless earphone and a smartphone camera for effective home training coaching in the non-face-to-face era. In detail, it is to develop a feedback system that may convince the user that the user is performing a home training motion with music the user listens to during exercise.

Figure 3A:
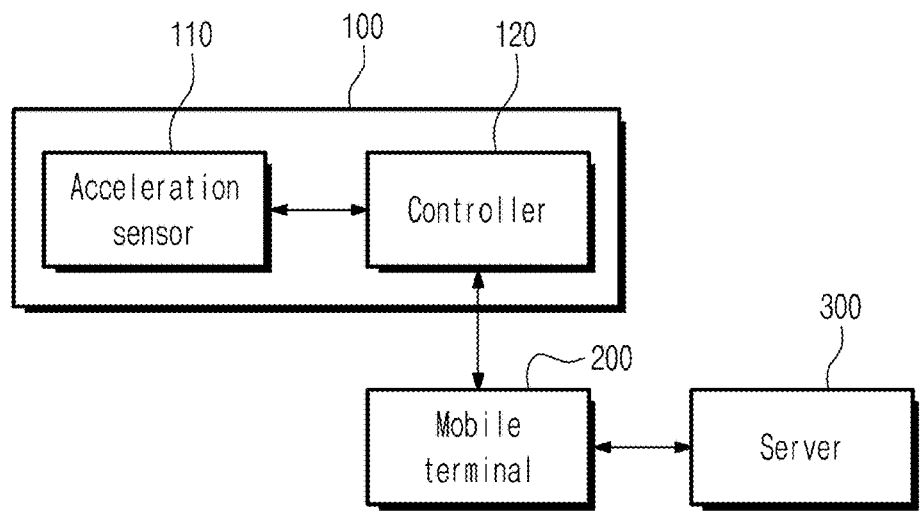
FIGS. 3A to 3C illustrate a configuration of an auditory feedback system according to other example embodiments.
Figure 3B:
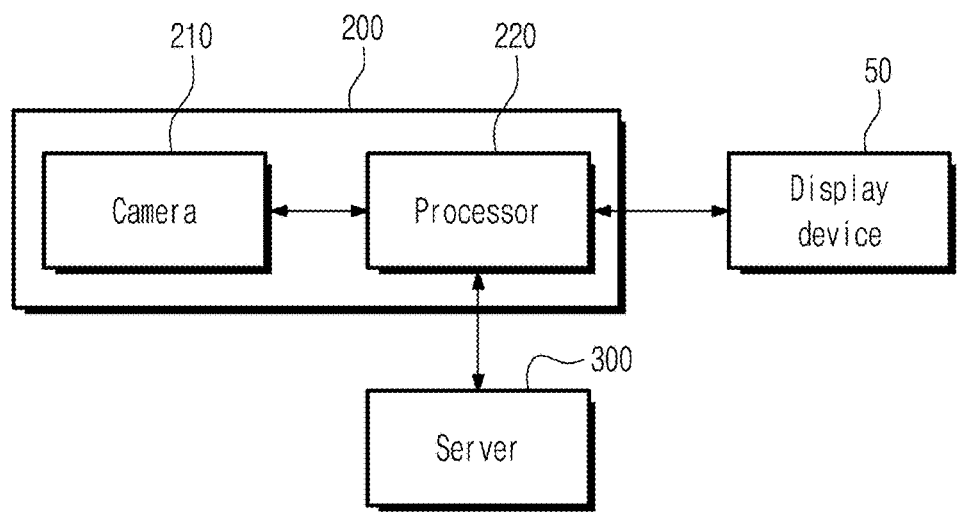
Figure 3C:
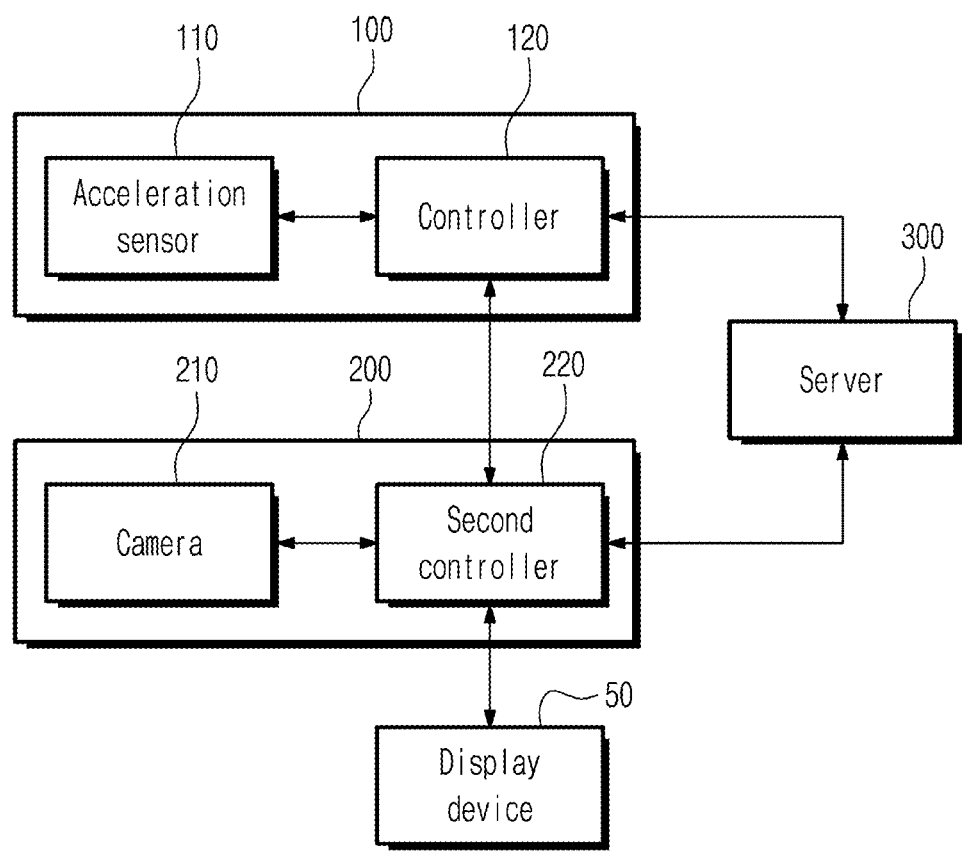

In detail, a detailed technical objective of the auditory feedback system using the wireless earphone and the smartphone according to the present invention is to provide real-time core movement data using a wearable sensor (wireless earphone) and a smartphone camera during home training exercise (data for convincing the user in relation to whether the user is exercising well). Also, it is to develop music-auditory feedback technology for modulating music the user listens to during exercise based on core data To achieve such technical objectives, the aforementioned walking motion/running motion of FIGS. 1A and 1B and exercise motion of FIG. 2 are considered as follows. In this regard, an auditory feedback system for music modulation using a wireless earphone and a smartphone according to the present invention are described. FIGS. 3A to 3C illustrate a configuration of an auditory feedback system according to other example embodiments. In detail, FIG. 3A illustrates an auditory feedback system according to a walking or running motion. Meanwhile, FIG. 3B illustrates an auditory feedback system according to a similarity status of an exercise motion. Also, FIG. 3C illustrates the auditory feedback system according to the walking or running motion of FIG. 3A and the auditory feedback system according to the similarity status of the exercise motion.

FIGS. 1A and 1B, and FIG. 3A, an auditory feedback system using a wireless earphone is provided. The auditory feedback system may include a wireless earphone 100, a user device 200 (e.g., mobile terminal), and a server 300. The wireless earphone 100 may include an acceleration sensor 110 and a controller 120.

The acceleration sensor 110 may be configured to measure a body inclination of a user walking or exercising with a wireless earphone 100 worn. The controller 120 may be configured to determine whether the body inclination is greater than or equal to a predetermined angle with respect to a body centerline.

When the body inclination is determined to be in a neutral state of being less than the predetermined angle, the controller 120 may provide a first type of music as first auditory feedback. When the body inclination is in an inclined state of being greater than or equal to the predetermined angle, the controller 120 may provide a second type of music as second auditory feedback.

Meanwhile, according to the present invention, a body inclination state, for example, a head inclination state, may be detected in a different axial direction and different auditory feedback may be provided accordingly. In this regard, when the head of the body is determined to be in the inclined state of being greater than or equal to a first angle in a direction of a horizontal axis, the controller 120 may provide the second auditory feedback as a first attribute. Meanwhile, when the head is determined to be in the inclined state of being greater than or equal to a second angle in a direction of a vertical axis, the controller 120 may provide the second auditory feedback as a second attribute. Also, when the head is determined to be in the inclined state of being greater than or equal to a third angle in a direction of a depth axis, the controller 120 may provide third auditory feedback as a third attribute.

For example, the second attribute may be determined such that the second auditory feedback may be provided at a shorter interval as sound with a higher pitch than the first auditory feedback. As another example, the second attribute may be determined such that the second auditory feedback may be provided at a shorter interval as sound with a higher volume than the first auditory feedback. Therefore, when inclined in the direction of the vertical axis, the controller 120 may provide feedback to the user such that an auditory feedback effect may be great and the user may correct an exercise posture.

This auditory feedback effect is provided as an example only and may be differently configured according to a physical condition and a health condition of the user. For example, when the user tends to walk or exercise with the head part being inclined in one direction in the direction of the horizontal axis, the auditory feedback may be configured in a different manner. In this case, the auditory feedback may be configured such that the first auditory feedback may be provided at a shorter interval as sound with a higher pitch than the second auditory feedback. Meanwhile, when the head part of the user is inclined in one direction in the direction of the horizontal axis, the attribute may be controlled such that corresponding auditory feedback may be provided at a shorter interval as sound with a higher pitch than auditory feedback in another direction.

Meanwhile, the controller 120 may transmit information on the body inclination, information on a degree at which the head of the body is inclined in the direction of the horizontal axis and the vertical axis, and attribute information of the auditory feedback to the mobile terminal 200 of the user walking or exercising. In this regard, the mobile terminal 200 may generate a first analysis result by analyzing a side-effect on a specific body part according to an exercise state of the user and the walking or exercise based on information on the body inclination, information on the degree at which the head of the body is inclined in the direction of the horizontal axis and the vertical axis, and a movement speed, a movement distance, and a movement path of the user. Therefore, the mobile terminal 200 may evaluate the exercise state by collectively considering exercise load of the user, such as a heart rate and a body temperature, an exercise distance, and an amount of exercise according to terrain in addition to exercise information collected by the acceleration sensor 110 of the wireless earphone 100.

Meanwhile, the server 300 may receive, from the mobile terminal 200, and store information on the body inclination, information on the degree at which the head of the body is inclined in the direction of the horizontal axis and the vertical axis, and the movement speed, the movement distance, and the movement path of the user. The server 300 may generate a second analysis result based on prestored information on the body inclination, information on the degree at which the head of the body is inclined in the direction of the horizontal axis and the vertical axis, information on the movement speed, the movement distance, and the movement path of the user, the received information, and information on a body inclination and movement state information on a plurality of users. Therefore, the server 300 may generate the analysis result by considering exercise related state information that is received and stored from an exercise start point in time in addition to exercise related state information that is currently received from the mobile terminal 200. Also, the server 300 may generate the analysis result by considering all the exercise related information previously performed in addition to exercise related information of a current point in time and the exercise start point in time.

Also, the server 300 may finally generate an analysis result about the side-effect according to the exercise state of the user and the walking or exercising based on the first analysis result and the second analysis result. Therefore, the server 300 may generate the analysis result by considering exercise related state information that is received and stored from the exercise start point in time in addition to exercise related state information that is currently received from the mobile terminal 200. Also, the server 300 may generate the analysis result by considering all the exercise related information previously performed in addition to exercise related information of the current point in time and the exercise start point in time.

Meanwhile, the controller 120 may provide auditory feedback information based on the analysis result received from the mobile terminal 100 and the server 300. In this regard, the controller 120 may determine whether the body inclination is greater than or equal to the predetermined angle with respect to the body centerline based on the first analysis result and the second analysis result received from the mobile terminal 100 and the server 300. For example, the controller 120 may determine whether the body inclination is greater than or equal to the predetermined angle for a predetermined angle time or more with respect to the body centerline based on the first analysis result and the second analysis result. Therefore, the controller 120 may determine whether a body inclination state according to the first analysis result and the second analysis result is inappropriate. Whether the body inclination state is inappropriate may be determined by the mobile terminal 100 or the server 300, or may be determined by the controller 120 in conjunction with the mobile terminal 100 or the server 300.

Referring to FIGS. 2 and 3B, an auditory feedback system for music modulation using a smartphone is provided. The auditory feedback system may include a display device 50 and a mobile terminal 200. The auditory feedback system may further include a server 300 in addition to the display device 50 and the mobile terminal 200. The mobile terminal 200 may include a camera 210 and a processor 220. Meanwhile, the display device 50 may be configured to play back an exercise motion of an expert/instructor.

The camera 210 may be configured to capture the user during exercise. Meanwhile, the camera may be a camera provided to another electronic device, for example, the display device, in addition to the mobile terminal and may be a thermal infrared (IR) camera for measuring respiration or body temperature.

The processor 220 may be configured to compare and analyze a motion of the user captured by the camera 210 and a motion of an expert of an exercise program in which the user is exercising. The processor 220 may analyze a similarity between the motion of the user and the motion of the expert for a specific body part selected based on a type of the exercise program and an exercise motion.

Here, the type of the exercise program may be used as a broad concept that includes all tasks requiring a specific posture of the user, for example, meditation, office work, and study.

Also, when the motion of the user is determined to be dissimilar to the motion of the expert, the processor 220 may control a speaker to provide auditory feedback. In this regard, the speaker that provides the auditory feedback may be a speaker of the mobile terminal 200. As another example, the speaker that provides the auditory feedback may be a speaker of the display device 50. As another example, when motions of at least two body parts mismatch, different auditory feedback may be simultaneously output through different speakers.

Meanwhile, movement information of a wireless earphone worn by the expert may be learned and transmitted to the mobile terminal 200. The processor 220 may compare the learned movement information of the movement of the user and may provide auditory feedback. In this regard, the movement information of the wireless earphone worn by the expert may be learned when generating a corresponding video or before distribution after generating the video. Also, when the corresponding video is real-time streaming, the movement information of the wireless earphone worn by the expert may be learned almost in real time and may be transmitted to the mobile terminal. In this case, a video that includes a motion of the user is also stored and an exercise motion mismatch status may be determined in units of time interval and auditory feedback may be provided.

Meanwhile, the auditory feedback according to the exercise motion mismatch status according to the present invention may be configured to be included in the stored video. In this regard, the processor 220 may store a corresponding frame in which the motion of the user is determined to be dissimilar to the motion of the expert in the captured video. The processor 220 may display the motion of the user that is dissimilar to the motion of the expert to be different for each body part of the user in the corresponding frame. The processor 220 may include and store feedback attribute information in the corresponding frame such that different auditory feedback may be played back for each body part. Therefore, when the motion of the user dissimilar to the motion of the expert is displayed in response to playback of a file that stores the corresponding frame, the processor 220 may control different auditory feedback to be played back based on the feedback attribute information.

Meanwhile, the auditory feedback system for music modulation using the wireless earphone and the auditory feedback system for music modulation using the smartphone may be configured to interact with each other. In this regard, FIGS. 1A to 2 and FIG. 3C, the auditory feedback system may include a wireless earphone 100 and a user device 200 (e.g., a mobile terminal 200). The wireless earphone 100 may be configured to include an acceleration sensor 110 and a controller 120. Also, the auditory feedback system may further include a display device 50. Also, the auditory feedback system may further include a server 300. Meanwhile, the mobile terminal 200 may include a camera 210 and a second controller 220.

As described above, description made above with reference to FIG. 3A may apply to a detailed motion of the wireless earphone 100. Meanwhile, referring to FIGS. 1A to 2 and FIG. 3C, the camera 210 may be configured to capture the user during exercise. The second controller 220 may be configured to compare and analyze a motion of the user captured by the camera and a motion of an expert of an exercise program in which the user is exercising.

The second controller 220 may analyze a similarity between the motion of the user and the motion of the expert of a specific body part selected based on a type of the exercise program and an exercise motion. Movement information of a wireless earphone worn by the expert may be learned and transmitted to the mobile terminal. The second processor 220 may compare the learned movement information of the movement of the user and may provide the auditory feedback.

The second controller 220 may analyze a similarity between the motion of the user and the motion of the expert for each body part of the user based on the type of the exercise program and the exercise motion. Also, when the motion of the user is determined to be dissimilar to the motion of the expert, the second controller 220 may control a speaker to provide different auditory feedback for each body part.

The second controller 220 may store a corresponding frame in which the motion of the user is determined to be dissimilar to the motion of the expert in the captured video. In this regard, the second controller 220 may display the motion of the user that is dissimilar to the motion of the expert for each body part of the user in the corresponding frame. Meanwhile, the second controller 220 may include and store feedback attribute information in the corresponding frame such that different auditory feedback may be played back for each body part.

Figure 4:
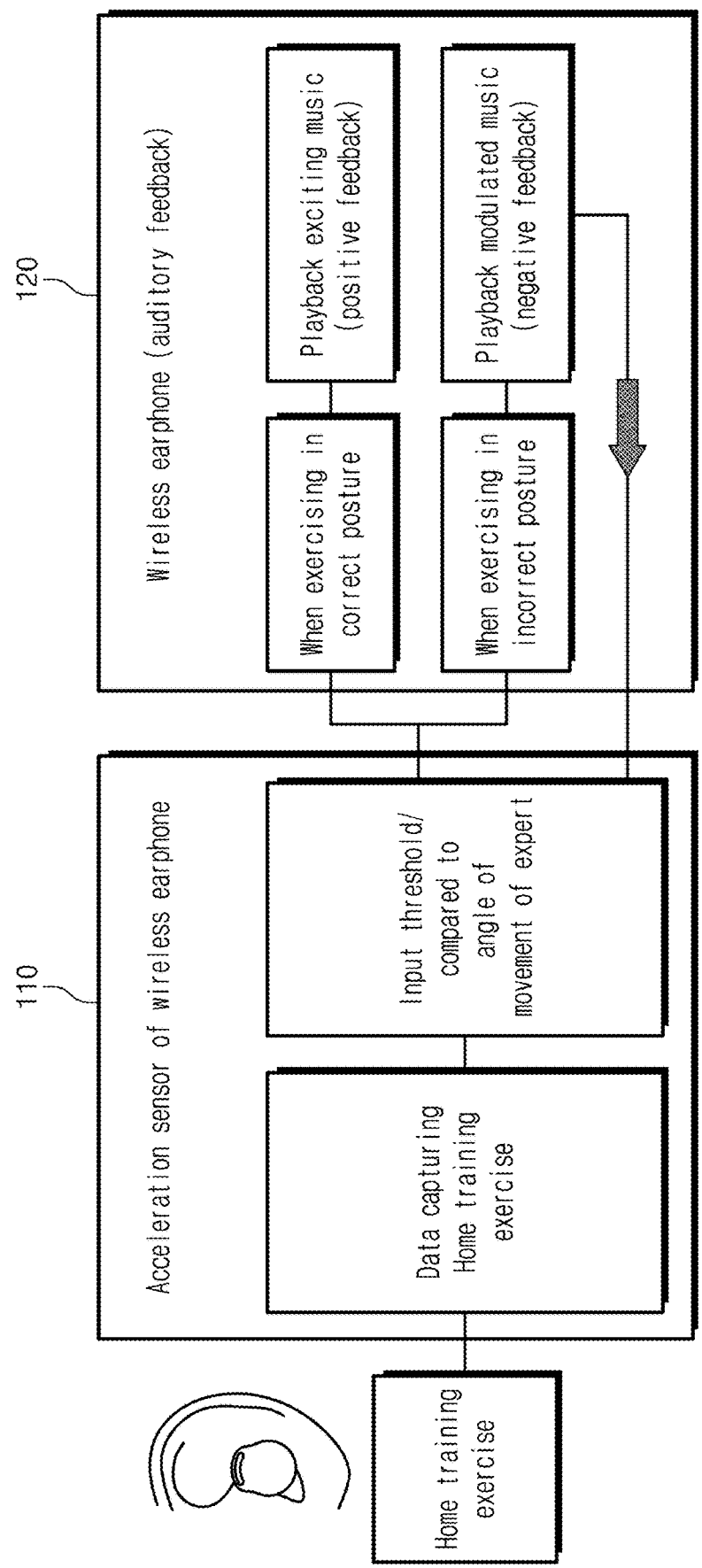
FIG. 4 illustrates a conceptual diagram of an acceleration sensing method and auditory feedback providing method algorithm according to an example embodiment.

Hereinafter, a sensing method and auditory feedback providing method algorithm will be described in association with the auditory feedback system for music modulation using the wireless earphone and the smartphone according to the present invention. In this regard, FIG. 4 illustrates a conceptual diagram of the acceleration sensing method and auditory feedback providing method algorithm using the wireless earphone.

FIGS. 1A and 1B and FIGS. 3A to 4, the auditory feedback system may be configured with a wireless earphone 100—camera 210 of smartphone—app interworking system.

1) User/expert registration, music modulation, and a type of exercise may be selected through a smartphone/mobile app.
2) The wireless earphone 100 may provide auditory feedback according to thresholds of a head movement (detected by the wireless earphone 100) and a body part movement (detected by the camera 210).
3) The camera 210 of the smartphone may automatically recognize a body part of the user as a tensor flow and may provide motion data.

Therefore, during home training exercise, a body inclination, for example, inclination of a head, may be detected through data capturing. Whether an angle of inclination of the head is greater than or equal to an input threshold or whether an angle of a body part associated with a movement of a specific body part and an angle of a body part associated with a movement of the expert are greater than or equal to the threshold is compared. Here, the angle of inclination of the head or the angle of the specific body part may be detected through the acceleration sensor 110 of the wireless earphone 100. According to an application, the angle of the specific body part may be detected through the camera 210. When the user is exercising in a correct posture, the controller 120 of the wireless earphone may output positive auditory feedback (e.g., exciting music). Also, when the user is exercising in an incorrect posture, the controller 120 may output negative auditory feedback (e.g., modulated music).

A body part posture detection method according to the present invention may be applied to the following various exercises. 1) The body part posture detection method may be applied to three stages of indoor walking motion (such as on the floor and on a treadmill). Stage 1 may be walking in place, stage 2 may be walking diagonally, forward, backward, and left and right, and stage 3 may be stage 2+additional arm motion.

The body part posture detection method may be applied to at least one of 2) running exercise on the floor and treadmill, 3) indoor bicycle exercise, 4) squat, lateral squat, lunge exercise, 5) balance exercise (one-legged standing with eyes closed/open, one-armed/one-legged raising in a quadrupedal posture), and 6) muscle strength exercise. Also, the body part posture detection method may be at least one of 7) planks, 8) sit-ups, 9) push-ups, 10) hula hoops, 11) stair climbing, 12) jumping exercise, 13) fitness, 14) health, 15) rehab and exercise, 16) yoga, 17) Pilates, 18) Zumba and dance, 19) swing exercise, such as golf and baseball, 20) meditation, 21) office work, and 22) study. The muscle strength exercise may be performed in a standing posture or a sitting posture. The muscle strength exercise in the standing posture may be at least one of hip joint abduction, extension, flexion, joint rotation/knee bending/trunk rotation/ankle dorsiflexion, and plantar flexion. The sitting posture exercise may be at least one of hip joint flexion, abduction/trunk rotation/knee extension exercise.

Through the auditory feedback system according to body part posture detection according to the present invention, even when a health management expert (personal training, yoga, Pilates, etc.) and a physical therapist remotely performs exercise and evaluation/management, issues may be guided. Therefore, the auditory feedback system according to the body part posture detection according to the present invention may be technology necessary in the era of remote health management.

The auditory feedback system for music modulation using the wireless earphone and the smartphone according to the present invention is described above. The auditory feedback system for music modulation using the wireless earphone and the smartphone according to the present invention has the following technical effect.

According to the present invention, it is possible to provide an auditory feedback system for music modulation using a wireless earphone and/or smartphone during exercise.

According to the present invention, it is possible to provide feedback on an exercise state through an auditory feedback system without a need to gaze at information that is separately being displayed during exercise through a wireless earphone or a speaker of a mobile terminal.

According to the present invention, it is possible to provide an auditory feedback system for music modulation without a separate sensor device or wearable device during exercise through a wireless earphone or a speaker of a mobile terminal.

The aforementioned features and effects of the present invention may become more clear through the following detailed description associated with the accompanying drawings and accordingly, one skilled in the art to which the present invention pertains may easily implement the technical spirit of the present invention.

Various modifications may be made to the present invention and some example embodiments may be provided and thus, specific example embodiments are illustrated in drawings and described in detail in the detailed description. However, the present invention is not construed as limited to specific implementation and should be understood to include all changes, equivalents, and replacements within the idea and the technical scope of the present invention.

According to software implementation, design and parameter optimization for each of components as well as procedures and functions described herein may be implemented as a separate software module. A software code may be implemented with a software application written in an appropriate program language. The software code may be stored in a memory and may be executed by a controller or a processor.

What is claimed is:

1. An auditory feedback system comprising:
    an acceleration sensor configured to measure a body inclination of a user walking or exercising with a wireless earphone worn; and
    a controller configured to determine whether the body inclination is greater than or equal to a predetermined angle with respect to a body center line,
    wherein the controller controls the wireless earphone to provide a first type of music as first auditory feedback when the body inclination is determined to be in a neutral state of being less than the predetermined angle, and to provide a second type of music as second auditory feedback when the body inclination is in an inclined state of being greater than or equal to the predetermined angle.

2. The auditory feedback system of claim 1, wherein the controller provides the second auditory feedback as a first attribute when a head of the body is determined to be in the inclined state of being greater than or equal to a first angle in a direction of a horizontal axis, and provides the second auditory feedback as a second attribute when the head is determined to be in the inclined state of being greater than or equal to a second angle in a direction of a vertical axis, and
    the second attribute is determined such that the second auditory feedback is provided at a shorter interval as sound with a higher pitch than the first auditory feedback.

3. The auditory feedback system of claim 2, wherein the controller transmits information on the body inclination, information on a degree at which the head of the body is inclined in the direction of the horizontal axis and the vertical axis, and attribute information of the auditory feedback to a mobile terminal of the user walking or exercising.

4. The auditory feedback system of claim 3, wherein the mobile terminal generates a first analysis result by analyzing a side-effect on a specific body part according to an exercise state of the user and the walking or exercise based on information on the body inclination, information on the degree at which the head of the body is inclined in the direction of the horizontal axis and the vertical axis, and a movement speed, a movement distance, and a movement path of the user.

5. The auditory feedback system of claim 4, further comprising:
    a server configured to receive, from the mobile terminal, and store information on the body inclination, information on the degree at which the head of the body is inclined in the direction of the horizontal axis and the vertical axis, and the movement speed, the movement distance, and the movement path of the user,
    wherein the server generates a second analysis result based on prestored information on the body inclination, information on the degree at which the head of the body is inclined in the direction of the horizontal axis and the vertical axis, information on the movement speed, the movement distance, and the movement path of the user, the received information, and information on a body inclination and movement state information on a plurality of users, and finally generates an analysis result about the side-effect according to the exercise state of the user and the walking or exercising based on the first analysis result and the second analysis result.

6. The auditory feedback system of claim 1, further comprising:
    a camera configured to capture a user during exercise; and
    a second controller configured to compare and analyze a motion of the user captured by the camera and a motion of an expert of an exercise program in which the user is exercising,
    wherein the second controller analyzes a similarity between the motion of the user and the motion of the expert for a specific body part selected based on a type of the exercise program and an exercise motion and controls a speaker to provide auditory feedback when the motion of the user is determined to be dissimilar to the motion of the expert, and movement information of a wireless earphone worn by the expert is learned and transmitted to the mobile terminal, and the second controller compares the learned movement information and the motion of the user and provides the auditory feedback.

7. The auditory feedback system of claim 6, wherein the second controller analyzes the similarity between the motion of the user and the motion of the expert for each body part of the user based on the type of the exercise program and the exercise motion and controls the speaker to provide different auditory feedback for each body part when the motion of the user is determined to be dissimilar to the motion of the expert.

8. The auditory feedback system of claim 6, wherein the second controller stores a corresponding frame in which the motion of the user is determined to be dissimilar to the motion of the expert in the captured video, and displays the motion of the user that is dissimilar to the motion of the expert for each body part of the user in the corresponding frame, and includes and stores feedback attribute information in the corresponding frame such that different auditory feedback is playable for each body part.

9. An auditory feedback system comprising:

a camera configured to capture a user during exercise; and a processor configured to compare and analyze a motion of the user captured by the camera and a motion of an expert of an exercise program in which the user is exercising, wherein the processor analyzes a similarity between the motion of the user and the motion of the expert for a specific body part selected based on a type of the exercise program and an exercise motion and controls a speaker to provide auditory feedback when the motion of the user is determined to be dissimilar to the motion of the expert, and movement information of a wireless earphone worn by the expert is learned and transmitted to the mobile terminal, and the processor compares the learned movement information and the motion of the user and provides the auditory feedback.

10. The auditory feedback system of claim 9, wherein the processor stores a corresponding frame in which the motion of the user is determined to be dissimilar to the motion of the expert in the captured video, and displays the motion of the user that is dissimilar to the motion of the expert for each body part of the user in the corresponding frame, and includes and stores feedback attribute information in the corresponding frame such that different auditory feedback is playable for each body part, and when the motion of the user dissimilar to the motion of the expert is displayed in response to playback of a file that stores the corresponding frame, the different auditory feedback is displayed based on the feedback attribute information.

\* \* \* \* \*